(12) United States Patent
Fukushima

(10) Patent No.: US 11,885,775 B2
(45) Date of Patent: Jan. 30, 2024

(54) SAMPLE INJECTION DEVICE

(71) Applicant: SHIMADZU CORPORATION, Kyoto (JP)

(72) Inventor: Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 469 days.

(21) Appl. No.: 16/977,499

(22) PCT Filed: Dec. 27, 2018

(86) PCT No.: PCT/JP2018/048109
§ 371 (c)(1),
(2) Date: Sep. 2, 2020

(87) PCT Pub. No.: WO2019/239619
PCT Pub. Date: Dec. 19, 2019

(65) Prior Publication Data
US 2020/0393425 A1 Dec. 17, 2020

(30) Foreign Application Priority Data
Jun. 13, 2018 (JP) ................ 2018-112556

(51) Int. Cl.
G01N 30/24 (2006.01)
G01N 1/22 (2006.01)
G01N 30/18 (2006.01)
G01N 30/02 (2006.01)

(52) U.S. Cl.
CPC ............ *G01N 30/24* (2013.01); *G01N 1/22* (2013.01); *G01N 30/18* (2013.01); *G01N 2030/025* (2013.01)

(58) Field of Classification Search
CPC .......... G01N 30/24; G01N 1/22; G01N 30/18; G01N 2030/025; G01N 35/1079; G01N 35/1095

See application file for complete search history.

(56) References Cited

U.S. PATENT DOCUMENTS

| 5,783,742 A | 7/1998 | Shibamoto et al. |
| 5,879,627 A | 3/1999 | Tanihata |
| 9,810,668 B2 * | 11/2017 | Neal ................. G01N 35/1011 |

(Continued)

FOREIGN PATENT DOCUMENTS

| JP | 9-145700 A | 6/1997 |
| JP | 3367319 B2 | 1/2003 |
| JP | 2011-179839 A | 9/2011 |

OTHER PUBLICATIONS

Tomita, Sample Injecting Device, 2011, p. 3, (JP 2011179839 A) (Year: 2011).*

(Continued)

*Primary Examiner* — Kristina M Deherrera
*Assistant Examiner* — Mark A Shabman
(74) *Attorney, Agent, or Firm* — Sughrue Mion, PLLC

(57) ABSTRACT

In a sample injection device (100), a controller (23) is configured or programmed to control a syringe drive (21) such that in a penetration operation in which a syringe (10) is moved to a side of a sample introduction portion (910) and a needle (11) penetrates a lid member (911), a moving speed at a time when a tip (11*b*) of the needle contacts the lid member is a second moving speed that is low.

5 Claims, 3 Drawing Sheets

(56) References Cited

U.S. PATENT DOCUMENTS

2008/0148872 A1* 6/2008 Kenney .............. G01N 35/1079
73/864.11
2011/0209565 A1 9/2011 Tomita

OTHER PUBLICATIONS

Bannon, C.D. et al., "Analysis of Fatty Acid Methyl Esters with High Accuracy and Reliability", Journal of Chromatography, 1987, vol. 407, p. 231-241, ISSN 0021-9673, 11 pages.
International Search Report for PCT/JP2018/048109 dated Mar. 26, 2019.
Written opinion for PCT/JP2018/048109 dated Mar. 26, 2019.

* cited by examiner

SAMPLE INJECTION DEVICE

CROSS-REFERENCE TO RELATED APPLICATIONS

This application is a National Stage of International Application No. PCT/JP2018/048109 filed Dec. 27, 2018, which claims priority under U.S.C. § 119(a) to Japanese Patent Application No. JP2018-112556 filed Jun. 13, 2018.

TECHNICAL FIELD

The present invention relates to a sample injection device, and more particularly, it relates to a sample injection device including a syringe having a needle at the tip to insert a sample into a sample introduction portion of a gas chromatograph.

BACKGROUND ART

Conventionally, a sample injection device including a syringe having a needle at the tip to insert a sample into a sample introduction portion of a gas chromatograph is known. Such a sample injection device is disclosed in Japanese Patent No. 3367319, for example.

Japanese Patent No. 3367319 discloses a sample injection device including a syringe (cylindrical cylinder) for introducing a sample into a gas chromatograph and a plunger (rod-shaped piston) for discharging the sample in the syringe to the outside of the syringe. The sample injection device described in Japanese Patent No. 3367319 includes a syringe drive mechanism that moves the syringe up and down, and a plunger drive mechanism that reciprocally drives the plunger in the syringe. Furthermore, in the sample injection device described in Japanese Patent No. 3367319, a needle having a flow path for suction or discharge inside is provided at the tip of the syringe.

In the sample injection device described in Japanese Patent No. 3367319, the syringe drive mechanism moves the syringe to the gas chromatograph side, and the needle is caused to penetrate a septum (lid member) that is a rubber lid of a sample introduction portion of the gas chromatograph. Then, with the tip of the needle entering the inside of the sample introduction portion, the plunger is driven by the plunger drive mechanism to inject the sample in the syringe into the sample introduction portion of the gas chromatograph. After the sample in the syringe is injected into the sample introduction portion, the syringe is moved by the syringe drive mechanism so as to be spaced apart from the gas chromatograph, and the needle is removed from the septum.

PRIOR ART

Patent Document

Patent Document 1: Japanese Patent No. 3367319

SUMMARY OF THE INVENTION

Problems to be Solved by the Invention

Although not clearly described in Japanese Patent No. 3367319, in a conventional sample injection device as described in Japanese Patent No. 3367319, in order to improve the penetrating force of a needle with respect to a rubber lid member, the moving speed of a syringe moved by a syringe drive mechanism may be controlled such that the descending speed at the time when the needle enters the lid member becomes the maximum speed in the device. In this case, as the moving speed of the syringe increases, the vibration (displacement) of the syringe in a direction (horizontal direction) orthogonal to the moving direction of the syringe increases, and thus a position at which the needle is stuck into the lid member is conceivably likely to vary.

Therefore, in the conventional sample injection device as described in Japanese Patent No. 3367319, when the descending speed at the time when the needle enters the lid member is controlled to be the maximum speed, the position at which the needle is stuck varies such that a hole formed in the lid member widens, and thus the airtightness of the lid member may disadvantageously decrease. In addition, due to a variation in the position at which the needle is stuck, the lid member is damaged, and crumbs of the rubber lid member are likely to be generated. Thus, the crumbs of the lid member are mixed into an analysis target by entering a flow path of the needle, for example, and a peak (ghost peak) of unknown origin may disadvantageously be generated in the analysis result of a sample.

The present invention is intended to solve the above problems. The present invention aims to provide a sample injection device capable of significantly reducing or preventing a decrease in the airtightness of a lid member of a gas chromatograph and significantly reducing or preventing generation of a ghost peak in the analysis result of a sample.

Means for Solving the Problem

In order to attain the aforementioned object, a sample injection device according to an aspect of the present invention includes a syringe including, at a tip of the syringe, a needle configured to inject a sample into a sample introduction portion of a gas chromatograph, a syringe drive configured to move the syringe to the sample introduction portion, and a controller configured or programmed to control the syringe drive. The needle is configured to penetrate a lid member configured to maintain airtightness of the sample introduction portion, the lid member being elastically deformable to allow the needle to penetrate therethrough, and the controller is configured or programmed to control the syringe drive such that in a first operation in which the syringe is moved to a side of the sample introduction portion and the needle penetrates the lid member, a moving speed from when a tip of the needle reaches a predetermined depth position of the lid member until when the tip of the needle penetrates the lid member is a first moving speed that is high, and at least a moving speed at a time when the tip of the needle contacts the lid member is a second moving speed that is low.

In the sample injection device according to this aspect of the present invention, as described above, the controller controls the syringe drive such that at least the moving speed at the time when the tip of the needle contacts the lid member is the second moving speed that is low. Accordingly, an increase in displacement in a direction orthogonal to a direction in which the needle is stuck when the tip of the needle contacts the lid member can be significantly reduced or prevented, and thus a variation in a position at which the needle is stuck can be significantly reduced or prevented. Consequently, the needle can be inserted along a hole already formed in the lid member, and thus widening of the hole formed in the lid member can be significantly reduced or prevented. Thus, a decrease in the airtightness of the lid member can be significantly reduced or prevented. In addition, generation of crumbs of the lid member due to damage of the lid member can be significantly reduced or prevented, and thus generation of a peak (ghost peak) of unknown origin in the analysis result of the sample due to mixing of crumbs of the lid member into an analysis target caused by entry into a flow path of the needle, for example, can be significantly reduced or prevented. Furthermore, the controller controls the syringe drive such that the moving speed from when the tip of the needle reaches the predetermined depth position of the lid member until when the tip of the needle penetrates the lid member is the first moving speed that is high. Accordingly, in the first operation, an increase in the time required for the needle to penetrate the lid member can be significantly reduced or prevented as compared with a case in which the low second moving speed is maintained, and thus an increase in the processing time required to analyze the sample can be significantly reduced or prevented. In addition, the tip of the needle is moved at a high speed at a position deeper than the predetermined depth position of the lid member such that the time during which the needle remains deep inside the lid member can be reduced, and thus a decrease in the airtightness of the lid member can be significantly reduced or prevented.

In the aforementioned sample injection device according to this aspect, the controller is preferably configured or programmed to control the syringe drive such that in the first operation, the moving speed from when the tip of the needle reaches the predetermined depth position of the lid member until when the tip of the needle penetrates the lid member is the first moving speed, and a moving speed from when the tip of the needle contacts the lid member until when the tip of the needle reaches the predetermined depth position of the lid member is the second moving speed. Accordingly, even after the tip of the needle contacts the lid member, the moving speed is the low second moving speed until the tip of the needle reaches the predetermined depth position of the lid member. Therefore, the needle is surely along the hole already formed in the lid member such that a variation in the position at which the needle is stuck can be reliably significantly reduced or prevented. In addition, during the low second moving speed, an increase in frictional heat generated between the needle and the lid member can be significantly reduced or prevented, and thus as compared with a case in which the moving speed is low only when the tip of the needle contacts the lid member, thermal transformation of the lid member can be significantly reduced or prevented. Consequently, generation of crumbs of the lid member due to damage of the lid member can be further significantly reduced or prevented.

In the aforementioned sample injection device according to this aspect, the controller is preferably configured or programmed to control the syringe drive such that in the first operation, the first moving speed from when the tip of the needle reaches the predetermined depth position of the lid member until when the tip of the needle penetrates the lid member gradually increases. Accordingly, as compared with a case in which the first moving speed is constant, an increase in the time required for the needle to penetrate the lid member can be further significantly reduced or prevented.

In the aforementioned sample injection device according to this aspect, the controller is preferably configured or programmed to control the syringe drive such that a distance from a surface of the lid member to the predetermined depth position gradually decreases as a number of repetitions of the first operation increases. When the first operation is repeated, the airtightness of the lid member is decreased due to exhaustion of the lid member. Thus, due to entry of the needle into the lid member, the depth of the lid member from the surface at which the airtightness of the lid member can be ensured is reduced. Therefore, with the configuration described above, the distance from the surface of the lid member to the predetermined depth position can be decreased in response to a decrease in the airtightness of the lid member, and thus a decrease in the airtightness of the lid member can be reliably significantly reduced or prevented.

In the aforementioned sample injection device according to this aspect, the controller is preferably configured or programmed to control the syringe drive such that a moving speed in a second operation in which the needle that has entered an inside of the sample introduction portion by the first operation is moved to a side opposite to the first operation and is removed from the lid member is higher than the moving speeds in the first operation. Accordingly, the moving speed in the second operation in which the needle is removed from the lid member can be relatively high, and thus the time during which the tip of the needle remains inside the sample introduction portion of the gas chromatograph can be reduced. Consequently, vaporization of the sample that remains in the flow path of the needle inside the sample introduction portion that is at a high temperature and high pressure in order to vaporize the sample and entry of the sample into the sample introduction portion can be significantly reduced or prevented. Therefore, impairment of the accuracy of analysis can be significantly reduced or prevented.

In the aforementioned sample injection device according to this aspect, the syringe drive preferably includes a pulse motor configured to operate in synchronization with pulse power, and the controller is preferably configured or programmed to control the pulse motor such that in the first operation, the moving speed from when the tip of the needle reaches the predetermined depth position of the lid member until when the tip of the needle penetrates the lid member is the first moving speed, and at least the moving speed at the time when the tip of the needle contacts the lid member is the second moving speed. The pulse motor may lose steps (be out of synchronization) when a large load is generated. Therefore, as described above, using the pulse motor in the syringe drive configured such that the moving speed at the time when the tip of the needle contacts the lid member is low is particularly useful in that it is possible to significantly reduce or prevent application of a large load to the syringe provided with the needle at the moment when the tip of the needle contacts the lid member.

Effect of the Invention

According to the present invention, as described above, it is possible to significantly reduce or prevent a decrease in the airtightness of the lid member of the gas chromatograph and significantly reduce or prevent generation of a ghost peak in the analysis result of the sample.

MODES FOR CARRYING OUT THE INVENTION

An embodiment embodying the present invention is hereinafter described on the basis of the drawings.

The configuration of a sample injection device 100 according to the embodiment of the present invention is now described with reference to FIGS. 1 to 5.

Figure 1:
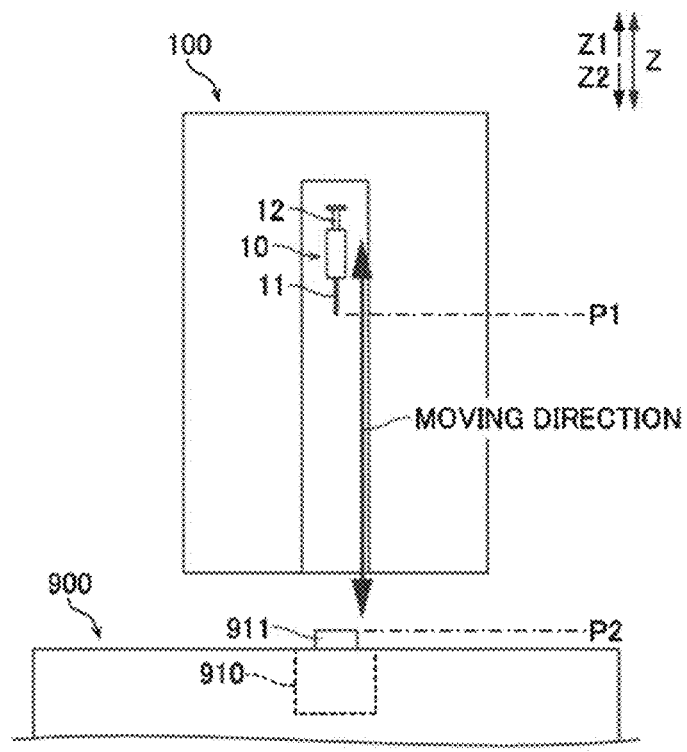
FIG. 1 is a diagram showing the overall configuration of a sample injection device according to an embodiment of the present invention.

As shown in FIG. 1, the sample injection device 100 is a device that injects a sample into a gas chromatograph 900 for analyzing the sample. The sample injection device 100 includes a syringe 10 for suctioning the sample from a vial (not shown) or the like that contains a sample to be analyzed and injecting the sample into a sample introduction portion 910 of the gas chromatograph 900. The syringe 10 is arranged above (Z1 side) the sample introduction portion 910.

The syringe 10 includes a needle 11 for inserting the sample into the sample introduction portion 910, and a plunger 12 for discharging the sample in the syringe 10 to the outside of the syringe 10.

Figure 4:
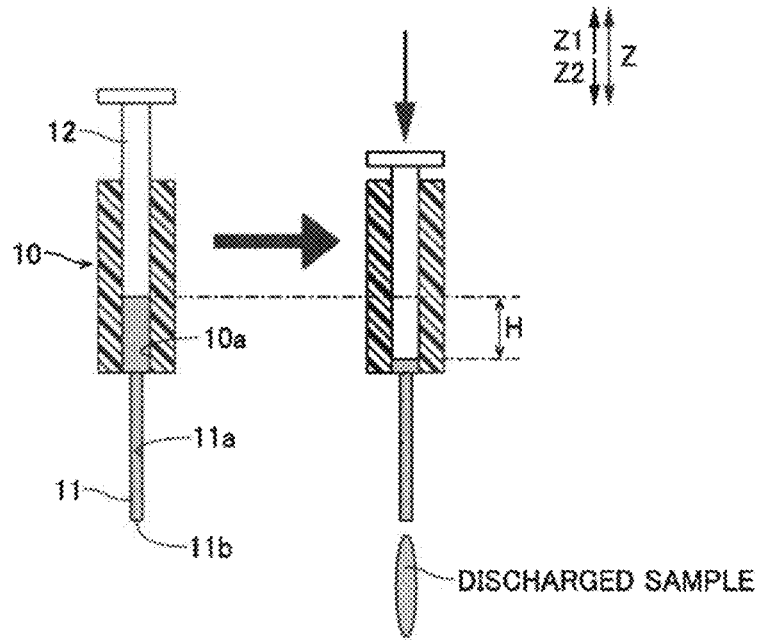
FIG. 4 is a diagram for illustrating sample injection by the syringe of the sample injection device according to the embodiment of the present invention.

As shown in FIG. 4, the needle 11 is provided at the tip (Z2 side) of the syringe 10 and includes a flow path 11a that connects the interior 10a of the syringe 10 to the outside. Furthermore, the plunger 12 is provided on the side (Z1 side) of the syringe 10 opposite to the needle 11, and is configured as a piston that can move in an upward-downward direction (Z direction) in the interior 10a of the syringe 10.

Thus, in the sample injection device 100, the plunger 12 is moved to the Z1 side such that the sample can be suctioned into the interior 10a of the syringe 10 via the flow path 11a formed in the needle 11. Furthermore, the plunger 12 is moved to the Z2 side such that the suctioned sample can be discharged to the outside of the syringe 10 via the flow path 11a formed in the needle 11.

FIG. 4 shows a state (left state) in which the sample is suctioned into the interior 10a of the syringe 10 and the syringe 10 is filled with the sample, and a state (right state) in which the sample filled in the syringe 10 is discharged to the outside of the syringe 10. In a normal use state, the amount of sample discharged to the outside of the syringe 10 by movement of the plunger 12 is substantially equal to the volume of sample inside the syringe 10 changed by movement of the plunger 12 to the Z2 side. That is, as shown in the state on the right side of FIG. 4, the amount of sample corresponding to a distance H by which the plunger 12 is moved to the Z2 side is discharged to the outside of the syringe 10.

The needle 11 is configured to penetrate a septum 911 provided in the sample introduction portion 910. The inside of the sample introduction portion 910 of the gas chromatograph 900 is at a high temperature and high pressure, and thus the septum 911 is configured to maintain the airtightness of the sample introduction portion 910. The needle 11 needs to penetrate the septum 911, and thus the septum 911 is elastically deformable such that the needle 11 can penetrate the septum 911. The septum 911 is made of rubber, for example.

Figure 2:
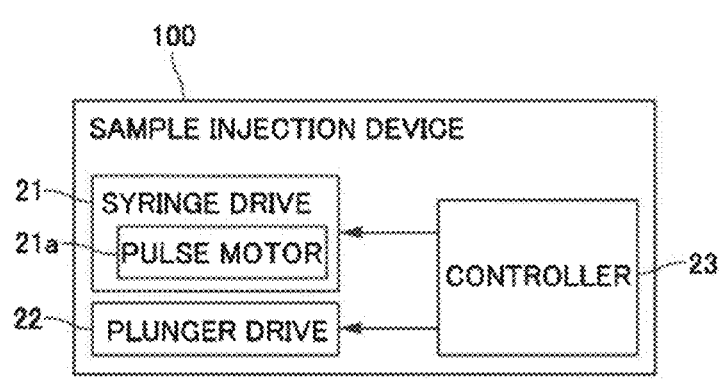
FIG. 2 is a block diagram for controlling a syringe and a plunger of the sample injection device according to the embodiment of the present invention.

As shown in FIG. 2, the sample injection device 100 includes a syringe drive 21, a plunger drive 22, and a controller 23.

The syringe drive 21 includes a pulse motor 21a that operates in synchronization with pulse power. The syringe drive 21 is configured to be able to move the syringe 10 (see FIG. 1) in the upward-downward direction (Z direction). In addition, the syringe drive 21 is configured to move the syringe 10 (see FIG. 1) to the sample introduction portion 910 (see FIG. 1).

The plunger drive 22 includes a pulse motor (not shown) that operates in synchronization with pulse power. The syringe drive 21 is configured to be able to move the plunger 12 (see FIG. 1) in the upward-downward direction (Z direction) within the syringe 10 (see FIG. 1).

The controller 23 is a computer including a central processing unit (CPU), a read-only memory (ROM), a random access memory (RAM), etc. The controller 23 is configured or programmed to control the syringe drive 21 and the plunger drive 22 to move the syringe 10 (see FIG. 1) and the plunger 12 (see FIG. 1), respectively.

Needle Penetration and Removal Operations

The penetration operation of the needle 11 into the septum 911 and the removal operation of the needle 11 from the septum 911 are now described with reference to FIGS. 1 and 3. The penetration operation and the removal operation are examples of a "first operation" and a "second operation" in the claims, respectively.

The penetration operation is an operation of moving the syringe 10 to the sample introduction portion 910 side (Z2 side) and causing the needle 11 to penetrate the septum 911. The removal operation is an operation of moving the needle 11 that has entered the inside of the sample introduction portion 910 by the penetration operation to the side (Z1 side) opposite to the penetration operation and removing the needle 11 from the septum 911. It is assumed that there is the sample suctioned from the vial or the like in the syringe 10 before the penetration operation is started.

As shown in FIG. 1, in the penetration operation, the controller 23 (see FIG. 2) arranges the syringe 10 such that the tip 11b (see FIG. 3) of the needle 11 is at a position P1 of an upper portion of the sample injection device 100. Then, the controller 23 (see FIG. 2) controls the syringe drive 21 (see FIG. 2) to move the syringe 10 to the lower side (Z2 side) to cause the needle 11 to penetrate the septum 911. Then, the controller 23 (see FIG. 2) controls the syringe drive 21 (see FIG. 2) to move the syringe 10 until the tip 11b of the needle 11 reaches a position P5 inside the sample introduction portion 910, as shown in FIG. 3.

The controller 23 (see FIG. 2) controls the plunger drive 22 (see FIG. 2) to drive the plunger 12 downward (Z2 side) in a state in which the tip 11b of the needle 11 is located at the position P5 and to discharge the sample in the syringe 10. The controller 23 starts the removal operation after discharge of the sample in the syringe 10 is completed.

In the removal operation, the controller 23 controls the syringe drive 21 (see FIG. 2) to move the syringe 10 to the upper side (Z1 side) and pull out the needle 11 from the septum 911. Then, the controller 23 (see FIG. 2) controls the syringe drive 21 (see FIG. 2) to move the syringe 10 until the tip 11b (see FIG. 3) of the needle 11 reaches the position P1 of the upper portion of the sample injection device 100, as shown in FIG. 1.

Figure 5:
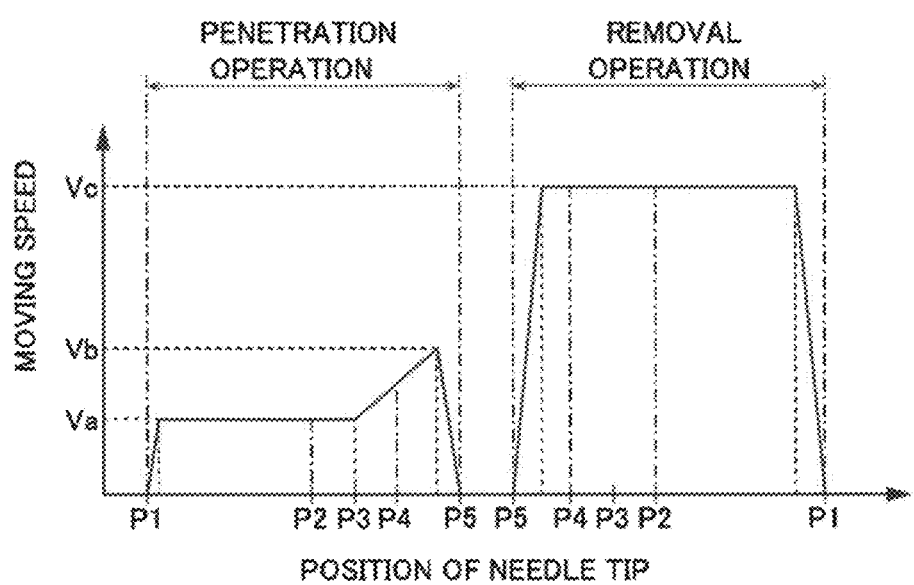
FIG. 5 is a diagram for illustrating the moving speed of the syringe of the sample injection device according to the embodiment of the present invention.

As shown in FIG. 5, in this embodiment, the controller 23 (see FIG. 2) is configured or programmed to control the syringe drive 21 (see FIG. 2) such that the moving speed from when the tip 11b (see FIG. 3) of the needle 11 (see FIG. 3) reaches a position P3 of the septum 911 (see FIG. 3) until when the tip 11b of the needle 11 penetrates the septum 911 (see FIG. 3) is a high first moving speed in the penetration operation. Furthermore, the controller 23 (see FIG. 2) is configured or programmed to control the syringe drive 21 (see FIG. 2) such that the moving speed at the time when the tip 11b (see FIG. 3) of the needle 11 (see FIG. 3) contacts the septum 911 (see FIG. 3) is a low second moving speed in the penetration operation. The position P3 is a depth position at which the airtightness of the septum 911 (see FIG. 3) does not decrease even when the needle 11 is inserted at a low moving speed. The position P3 is in the vicinity of a substantially central portion in a thickness direction (Z direction) of the septum 911 (see FIG. 3) at the start of use, for example. The position P3 is an example of a "predetermined depth position" in the claims.

Specifically, the controller 23 (see FIG. 2) is configured or programmed to control the syringe drive 21 (see FIG. 2) such that the moving speed from when the tip 11b (see FIG. 3) of the needle 11 (see FIG. 3) contacts the septum 911 (see FIG. 3) until when the tip 11b of the needle 11 reaches the position P3 of the septum 911 (see FIG. 3) is the second moving speed in the penetration operation. Furthermore, the controller 23 (see FIG. 2) is configured or programmed to control the syringe drive 21 such that the first moving speed from when the tip 11b (see FIG. 3) of the needle 11 (see FIG. 3) reaches the position P3 of the septum 911 (see FIG. 3) until when the tip 11b of the needle 11 penetrates the septum 911 (see FIG. 3) gradually increases in the penetration operation.

More specifically, as shown in FIG. 5, the controller 23 (see FIG. 2) controls the moving speed of the syringe 10 (see FIG. 3) moved by the syringe drive 21 as follows based on the position of the tip 11b (see FIG. 3) of the needle 11 (see FIG. 3) in the penetration operation. First, movement in a Z2 direction from the position P1 is started, and the moving speed of the syringe 10 (see FIG. 3) is accelerated to a moving speed Va. Then, the tip 11b of the needle 11 is brought into contact with a surface 911a (position P2) (see FIG. 3) of the septum 911 (see FIG. 3) while the moving speed of the syringe 10 is maintained at the moving speed Va. Then, while the moving speed of the syringe 10 is maintained at the moving speed Va, the tip 11b of the needle 11 is caused to enter the septum 911 (see FIG. 3) and to reach the position P3 of the septum 911 (see FIG. 3). The moving speed Va corresponds to the low second moving speed.

From the position P3 of the septum 911 (see FIG. 3), the moving speed of the syringe 10 (see FIG. 3) is gradually accelerated from the moving speed Va. Then, the tip 11b of the needle 11 penetrates the septum 911 (see FIG. 3) and enters the inside of the sample introduction portion 910 (see FIG. 3). Then, the moving speed of the syringe 10 (see FIG. 3) is decelerated to zero at the position P5 inside the sample introduction portion 910 (see FIG. 3). When the deceleration of the moving speed is started, the moving speed of the syringe 10 (see FIG. 3) is a moving speed Vb that is higher than the moving speed Va (several times as high as the moving speed Va, for example). The moving speed higher than the moving speed Va corresponds to the high first moving speed.

In this embodiment, the controller 23 (see FIG. 2) is configured or programmed to control the syringe drive 21 such that the moving speed in the removal operation is higher than the moving speeds in the penetration operation. Specifically, the controller 23 (see FIG. 2) controls the moving speed of the syringe 10 (see FIG. 3) moved by the syringe drive 21 (see FIG. 2) as follows based on the position of the tip 11b (see FIG. 3) of the needle 11 (see FIG. 3) in the removal operation. First, movement in a Z1 direction from the position P5 is started, and the moving speed of the syringe 10 (see FIG. 3) is accelerated to a moving speed Vc that is higher than the movement speed Vb (about ten times the moving speed Vb, for example). Then, while the moving speed of the syringe 10 (see FIG. 3) is maintained at the moving speed Vc, the tip 11b of the needle 11 is moved to the side (Z1 side) opposite to the penetration operation. Then, the moving speed of the syringe 10 (see FIG. 3) is decelerated to zero at the position P1.

Figure 3:
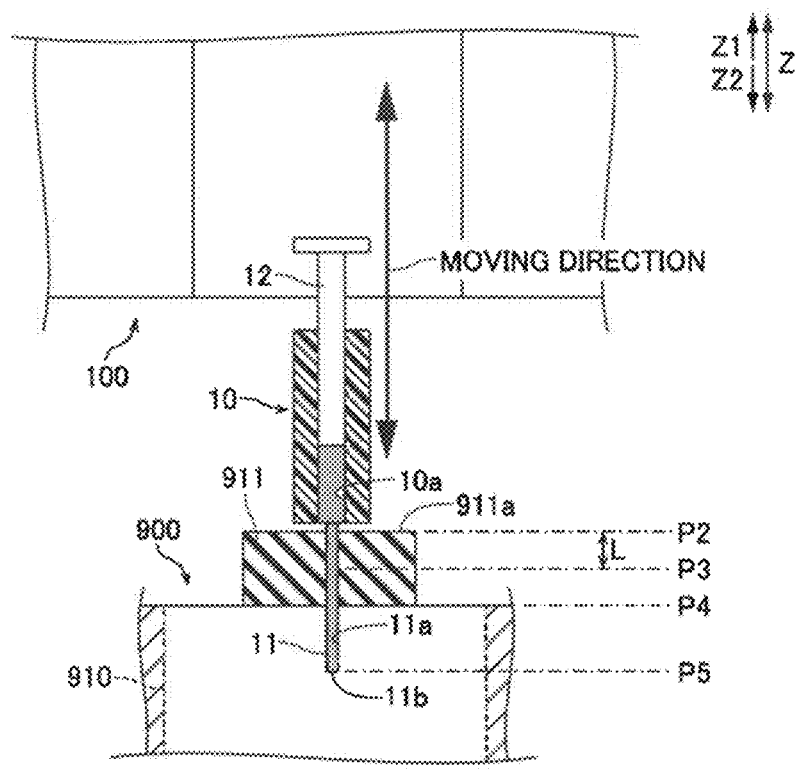
FIG. 3 is a diagram for illustrating movement of the syringe of the sample injection device according to the embodiment of the present invention.

As shown in FIG. 3, in this embodiment, the controller 23 (see FIG. 2) is configured or programmed to control the syringe drive 21 (see FIG. 2) such that a distance L from the surface 911a of the septum 911 to the position P3 gradually decreases as the number of repetitions of the penetration operation increases. Specifically, when the penetration operation is repeated, the airtightness of the septum 911 is decreased due to exhaustion of the septum 911. Therefore, due to entry of the needle 11 into the septum 911, the depth of the septum 911 from the surface 911a at which the airtightness of the septum 911 can be ensured is reduced. That is, a range in the septum 911 in which the needle 11 can be moved at the low second moving speed (see FIG. 5) is gradually reduced. Therefore, the controller 23 (see FIG. 2) performs a control such that the position P3 at which the moving speed is switched (from the moving speed Va to the moving speed Vb) is gradually closer to a position close to the surface 911a (position P2) of the septum 911 in response to an increase in the number of repetitions of the penetration operation. The number of repetitions of the penetration operation may be stored in a storage (not shown), for example.

Advantages of Embodiment

According to this embodiment, the following advantages are obtained.

According to this embodiment, as described above, the controller 23 is configured or programmed to control the syringe drive 21 such that the moving speed at the time when the tip 11b of the needle 11 contacts the septum 911 is the low second moving speed. Accordingly, an increase in displacement in a direction orthogonal to a direction in which the needle 11 is stuck when the tip 11b of the needle 11 contacts the septum 911 can be significantly reduced or prevented, and thus a variation in the position at which the needle 11 is stuck can be significantly reduced or prevented. Consequently, the needle 11 can be inserted along a hole already formed in the septum 911, and thus widening of the hole formed in the septum 911 can be significantly reduced or prevented. Thus, a decrease in the airtightness of the septum 911 can be significantly reduced or prevented. In addition, generation of crumbs of the septum 911 due to damage of the septum 911 can be significantly reduced or prevented, and thus generation of a peak (ghost peak) of unknown origin in the analysis result of the sample due to mixing of crumbs of the septum 911 into an analysis target caused by entry into the flow path of the needle 11, for example, can be significantly reduced or prevented. Furthermore, the controller 23 is configured or programmed to control the syringe drive 21 such that the moving speed from when the tip 11*b* of the needle 11 reaches the position P3 of the septum 911 until when the tip 11*b* of the needle 11 penetrates the septum 911 is the high first moving speed. Accordingly, in the penetration operation, an increase in the time required for the needle 11 to penetrate the septum 911 can be significantly reduced or prevented as compared with a case in which the low second moving speed is maintained, and thus an increase in the processing time required to analyze the sample can be significantly reduced or prevented. In addition, the tip of the needle 11 is moved at a high speed at a position deeper than P3 of the septum 911 such that the time during which the needle 11 remains deep inside the septum 911 can be reduced, and thus a decrease in the airtightness of the septum 911 can be significantly reduced or prevented.

According to this embodiment, as described above, the controller 23 is configured or programmed to control the syringe drive 21 such that the moving speed from when the tip 11*b* of the needle 11 reaches the position P3 of the septum 911 until when the tip 11*b* of the needle 11 penetrates the septum 911 is the first moving speed, and the moving speed from when the tip 11*b* of the needle 11 contacts the septum 911 until when the tip 11*b* of the needle 11 reaches the position P3 of the septum 911 is the second moving speed in the penetration operation. Accordingly, even after the tip 11*b* of the needle 11 contacts the septum 911, the moving speed is the low second moving speed until the tip 11*b* of the needle 11 reaches the position P3 of the septum 911. Therefore, the needle 11 is surely along the hole already formed in the septum 911 such that a variation in the position at which the needle 11 is stuck can be reliably significantly reduced or prevented. In addition, during the low second moving speed, an increase in frictional heat generated between the needle 11 and the septum 911 can be significantly reduced or prevented, and thus as compared with a case in which the moving speed is low only when the tip of the needle 11 contacts the septum 911, thermal transformation of the septum 911 can be significantly reduced or prevented. Consequently, generation of crumbs of the septum 911 due to damage of the septum 911 can be further significantly reduced or prevented.

According to this embodiment, as described above, the controller 23 is configured or programmed to control the syringe drive 21 such that the first moving speed from when the tip 11*b* of the needle 11 reaches the position P3 of the septum 911 until when the tip 11*b* of the needle 11 penetrates the septum 911 gradually increases in the penetration operation. Accordingly, as compared with a case in which the first moving speed is constant, an increase in the time required for the needle 11 to penetrate the septum 911 can be further significantly reduced or prevented.

According to this embodiment, as described above, the controller 23 is configured or programmed to control the syringe drive 21 such that the distance L from the surface 911*a* of the septum 911 to the predetermined depth position P3 gradually decreases as the number of repetitions of the penetration operation increases. Accordingly, the distance L from the surface 911*a* of the septum 911 to the position P3 can be decreased in response to a decrease in the airtightness of the septum 911, and thus a decrease in the airtightness of the septum 911 can be reliably significantly reduced or prevented.

According to this embodiment, as described above, the controller 23 is configured or programmed to control the syringe drive 21 such that the moving speed in the removal operation in which the needle 11 that has entered the inside of the sample introduction portion 910 by the penetration operation is moved to the side opposite to the penetration operation and is removed from the septum 911 is higher than the moving speeds in the penetration operation. Accordingly, the moving speed in the removal operation in which the needle 11 is removed from the septum 911 can be relatively high, and thus the time during which the tip of the needle 11 remains inside the sample introduction portion 910 of the gas chromatograph 900 can be reduced. Consequently, vaporization of the sample that remains in the flow path 11*a* of the needle 11 inside the sample introduction portion 910 that is at a high temperature and high pressure in order to vaporize the sample and entry of the sample into the sample introduction portion 910 can be significantly reduced or prevented. Therefore, impairment of the accuracy of analysis can be significantly reduced or prevented.

According to this embodiment, as described above, the syringe drive 21 includes the pulse motor 21*a* that operates in synchronization with pulse power. Furthermore, the controller 23 is configured or programmed to control the pulse motor 21*a* such that the moving speed from when the tip 11*b* of the needle 11 reaches the position P3 of the septum 911 until when the tip 11*b* of the needle 11 penetrates the septum 911 is the first moving speed, and the moving speed at the time when the tip 11*b* of the needle 11 contacts the septum 911 is the second moving speed in the penetration operation. Accordingly, the pulse motor that may lose steps (be out of synchronization) when a large load is generated can be effectively used while application of a large load to the syringe 10 provided with the needle 11 at the moment when the tip 11*b* of the needle 11 contacts the septum 911 is significantly reduced or prevented.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the syringe drive 21 includes the pulse motor 21*a* has been shown in the aforementioned embodiment, the present invention is not limited to this. In the present invention, the syringe drive 21 may include a motor other than the pulse motor such as a servo motor.

While the example in which the first moving speed from when the tip 11*b* of the needle 11 reaches the position P3 of the septum 911 until when the tip 11*b* of the needle 11 penetrates the septum 911 gradually increases in the penetration operation has been shown in the aforementioned embodiment, the present invention is not limited to this. In the present invention, the first moving speed from when the tip 11*b* of the needle 11 reaches the position P3 of the septum 911 until when the tip 11*b* of the needle 11 penetrates the septum 911 may be constant after increasing to some extent. Alternatively, the first moving speed may decrease to such an extent that the first moving speed is not lower than the second moving speed after increasing to some extent.

While the example in which the moving speed from when the tip 11*b* of the needle 11 contacts the septum 911 until when the tip 11*b* of the needle 11 reaches the position P3 of the septum 911 is the constant moving speed Va in the penetration operation has been shown in the aforementioned embodiment, the present invention is not limited to this. In the present invention, the moving speed from when the tip 11b of the needle 11 contacts the septum 911 until when the tip 11b of the needle 11 reaches the position P3 of the septum 911 may be changed from the moving speed Va. For example, after the tip 11b of the needle 11 enters the septum 911, the moving speed may be accelerated to higher than the moving speed Va.

While the example in which the moving speed is the constant movement speed Va until the tip 11b of the needle 11 contacts the septum 911 after movement of the syringe 10 is started from the position P1 and acceleration is performed for the first time in the penetration operation has been shown in the aforementioned embodiment, the present invention is not limited to this. In the present invention, the moving speed may be a moving speed other than the moving speed Va until the tip 11b of the needle 11 contacts the septum 911. For example, the moving speed may be a moving speed higher than the moving speed Va such that the time until when the tip 11b of the needle 11 contacts the septum 911 is reduced.

DESCRIPTION OF REFERENCE NUMERALS

10: syringe
11: needle
11a: tip (of the needle)
21: syringe drive
21a: pulse motor
23: controller
100: sample injection device
900: gas chromatograph
910: sample introduction portion
911: septum (lid member)
911a: surface (of the septum)
L: distance (from the surface of the septum to the predetermined depth position)
P3: position (predetermined depth position)

The invention claimed is:

1. A sample injection device comprising:
a syringe including, at a tip of the syringe, a needle configured to inject a sample into a sample introduction portion of a gas chromatograph;
a syringe drive configured to move the syringe to the sample introduction portion; and
a controller configured or programmed to control the syringe drive; wherein
the needle is configured to penetrate a lid member configured to maintain airtightness of the sample introduction portion, the lid member being elastically deformable to allow the needle to penetrate therethrough; and
the controller is configured or programmed to control the syringe drive such that in a first operation in which the syringe is moved to a side of the sample introduction portion and the needle penetrates the lid member, a moving speed from when a tip of the needle reaches a predetermined depth position of the lid member at which airtightness is maintained until when the tip of the needle penetrates the lid member is a first moving speed that is higher than a second moving speed, and at least a moving speed at a time when the tip of the needle contacts the lid member is a second moving speed that is lower than the first moving speed, and
the controller is configured or programmed to control the syringe drive such that a moving speed in a second operation in which the needle that has entered an inside of the sample introduction portion by the first operation is moved to a direction opposite to a direction of the first operation and is removed from the lid member is higher than the first moving speed and the second moving speed.

2. The sample injection device according to claim 1, wherein the controller is configured or programmed to control the syringe drive such that in the first operation, the moving speed from when the tip of the needle reaches the predetermined depth position of the lid member until when the tip of the needle penetrates the lid member is the first moving speed, and a moving speed from when the tip of the needle contacts the lid member until when the tip of the needle reaches the predetermined depth position of the lid member is the second moving speed.

3. The sample injection device according to claim 1, wherein the controller is configured or programmed to control the syringe drive such that in the first operation, the first moving speed from when the tip of the needle reaches the predetermined depth position of the lid member until when the tip of the needle penetrates the lid member increases.

4. The sample injection device according to claim 1, wherein the controller is configured or programmed to control the syringe drive such that a distance from a surface of the lid member to the predetermined depth position decreases as a number of repetitions of the first operation increases.

5. The sample injection device according to claim 1, wherein the syringe drive includes a pulse motor configured to operate in synchronization with pulse power; and
the controller is configured or programmed to control the pulse motor such that in the first operation, the moving speed from when the tip of the needle reaches the predetermined depth position of the lid member until when the tip of the needle penetrates the lid member is the first moving speed, and at least the moving speed at the time when the tip of the needle contacts the lid member is the second moving speed.

* * * * *